(12) United States Patent
Kang et al.

(10) Patent No.: US 11,289,956 B2
(45) Date of Patent: Mar. 29, 2022

(54) ROTATING ELECTRIC DEVICE

(71) Applicant: Dohyun Kang, Changwon-si (KR)

(72) Inventors: Dohyun Kang, Changwon-si (KR);
Byung Chul Woo, Changwon-si (KR);
Wook Hwang, Busan (KR)

(73) Assignee: Dohyun Kang, Changwon-si (KR)

( * ) Notice: Subject to any disclaimer, the term of this patent is extended or adjusted under 35 U.S.C. 154(b) by 0 days.

(21) Appl. No.: 16/651,941

(22) PCT Filed: Sep. 27, 2018

(86) PCT No.: PCT/KR2018/011419
§ 371 (c)(1),
(2) Date: Mar. 27, 2020

(87) PCT Pub. No.: WO2019/066487
PCT Pub. Date: Apr. 4, 2019

(65) Prior Publication Data
US 2020/0303973 A1    Sep. 24, 2020

(30) Foreign Application Priority Data

Sep. 28, 2017  (KR) .................. 10-2017-0126345

(51) Int. Cl.
*H02K 1/16* (2006.01)
*H02K 11/21* (2016.01)
(Continued)

(52) U.S. Cl.
CPC ............ *H02K 1/16* (2013.01); *H02K 1/2793* (2013.01); *H02K 3/48* (2013.01); *H02K 7/003* (2013.01); *H02K 11/21* (2016.01)

(58) Field of Classification Search
CPC . H02K 1/16; H02K 1/27; H02K 11/21; H02K 3/48; H02K 7/00; H02K 21/22;
(Continued)

(56) References Cited

U.S. PATENT DOCUMENTS

2004/0239199 A1* 12/2004 Qu .................. H02K 21/16
310/114
2008/0246359 A1  10/2008 Lee et al.
(Continued)

FOREIGN PATENT DOCUMENTS

CN         101282068 A    10/2008
CN         102427290 A     4/2012
(Continued)

OTHER PUBLICATIONS

Mudassir Raza et al., "Comparison Between Double Air Gap Vernier Motor with no Inner Stator Excitation and Single Air Gap Machine with no Inner Stator", The Korean Institute of Electrical Engineers, Oct. 23, 2015, pp. 137-139.
(Continued)

*Primary Examiner* — Naishadh N Desai
(74) *Attorney, Agent, or Firm* — Rabin & Berdo, P.C.

(57) ABSTRACT

A rotating electric device comprising: an outer stator (210) comprising an outer stator iron core (211) having a plurality of outer stator winding slots (213) formed on the inner peripheral surface thereof at a predetermined interval in the circumferential direction, and an outer winding (510) wound around an outer stator iron core tooth (218) relatively formed by a pair of outer stator winding slots (213) adjacent to each other; an inner stator (220) comprising an inner stator iron core (221) having a plurality of inner stator winding slots (223) formed on the outer peripheral surface thereof at a predetermined interval in the circumferential direction; and a rotor (300) having, between the outer stator (210) and the inner stator (220).

20 Claims, 15 Drawing Sheets

(51) Int. Cl.
   *H02K 1/2793* (2022.01)
   *H02K 3/48* (2006.01)
   *H02K 7/00* (2006.01)
(58) Field of Classification Search
   CPC ...... H02K 1/2793; H02K 1/148; H02K 21/16;
   H02K 21/14; H02K 7/003; H02K 16/04;
   H02K 7/083; H02K 7/088; H02K 1/2786;
   H02K 1/2773
   See application file for complete search history.

(56) References Cited

U.S. PATENT DOCUMENTS

| | | | |
|---|---|---|---|
| 2015/0008786 A1* | 1/2015 | Endo | H02K 1/2786 310/216.069 |
| 2015/0069875 A1* | 3/2015 | Lipo | H02K 1/2793 310/156.35 |
| 2017/0098989 A1 | 4/2017 | Kitada | |
| 2017/0126161 A1 | 5/2017 | Hijikata et al. | |

FOREIGN PATENT DOCUMENTS

| | | |
|---|---|---|
| CN | 202282690 U | 6/2012 |
| CN | 106416023 A | 2/2017 |
| CN | 106602823 A | 4/2017 |
| DE | 3915526 A1 | 8/1990 |
| JP | S61141975 U | 9/1986 |
| JP | 05-344698 A | 12/1993 |
| JP | 2010-208485 A | 9/2010 |
| JP | 2015-173583 A | 10/2015 |
| KR | 10-2003-0054753 A | 7/2003 |
| KR | 10-2007-0070355 A | 7/2007 |
| KR | 10-1027935 B1 | 4/2011 |
| KR | 10-2012-0112979 A | 10/2012 |

OTHER PUBLICATIONS

Byungtaek Kim et al., "Analysis of a PM Vernier Motor With Spoke Structure", IEEE Transactions on Industry Applications, Jan./Feb. 2016, pp. 217-225, vol. 52, No. 1.

Kenji Okada et al., "Analysis of a Vernier Motor with Concentrated Windings", IEEE Transactions on Magnetics, May 2013, pp. 2241-2244, vol. 49, No. 5.

Office Action of Chinese Patent Application No. 201880063789.1 dated Sep. 1, 2021.

Office Action of European Patent Application No. 18862258.3 dated May 14, 2021.

* cited by examiner

FIG. 9a $$\circ\!\!-\!\!A_1^+\!-\!A_1^-\!-\!a_1^+\!-\!a_1^-\!-\!A_2^+\!-\!A_2^-\!-\!a_2^+\!-\!a_2^-\!-\!\circ$$

FIG. 9b $$\circ\!-\!\begin{bmatrix} A_1^+\!-\!A_1^-\!-\!a_1^+\!-\!a_1^- \\ A_2^+\!-\!A_2^-\!-\!a_2^+\!-\!a_2^- \end{bmatrix}\!-\!\circ$$

FIG. 9c $$\circ\!-\!\begin{bmatrix} A_1^+\!-\!A_1^-\!-\!A_2^+\!-\!A_2^- \\ a_1^+\!-\!a_1^-\!-\!a_2^+\!-\!a_2^- \end{bmatrix}\!-\!\circ$$

FIG. 10a $$\circ\!\!-\!\!A_1^+\!-\!A_1^-\!-\!A_2^+\!-\!A_2^-\!-\!\circ$$

FIG. 10b $$\circ\!-\!\begin{bmatrix} A_1^+\!-\!A_1^- \\ A_2^+\!-\!A_2^- \end{bmatrix}\!-\!\circ$$

FIG. 11

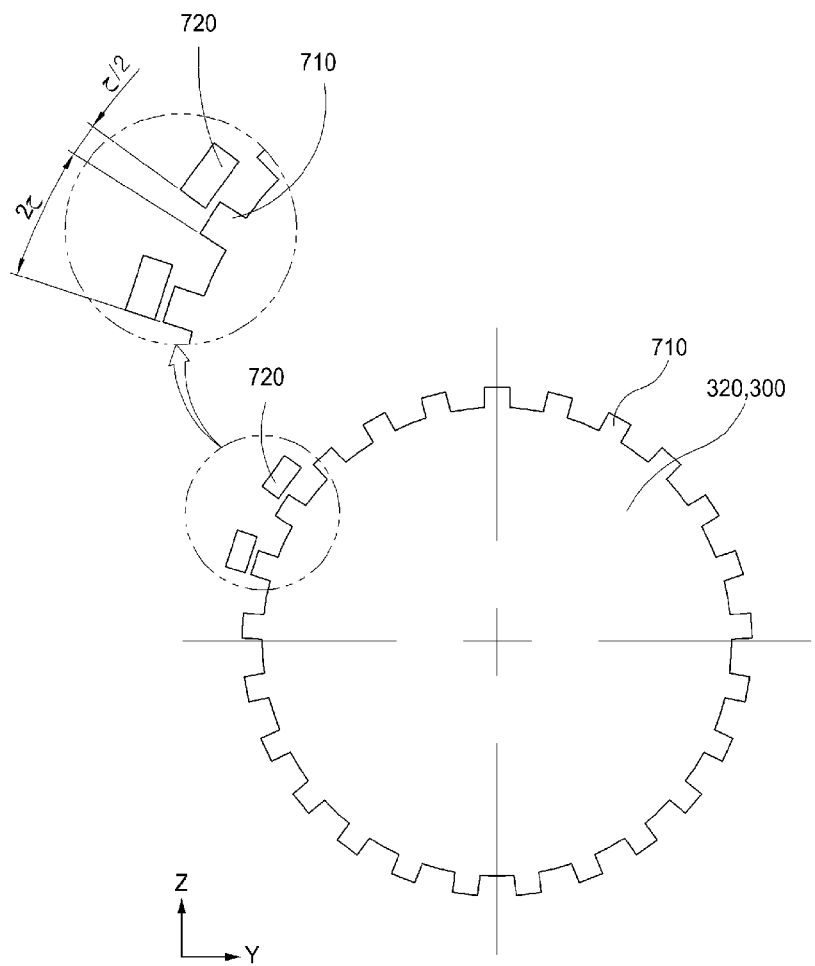

ROTATING ELECTRIC DEVICE

TECHNICAL FIELD

The present invention relates to a rotating electric device such as an electric motor or a generator.

BACKGROUND ART

In recent years, as interest in transport units using electricity is increasing, electric vehicles, electric bicycles, electric two-wheeled vehicles, and tricycles have been commercialized. In addition, high outputs of electric motors in robot fields for factory automation and generators for generating electricity in industries are required, and thus, efforts for achieving miniaturization and price competitiveness are increasing.

Particularly, when electric motors that are essentially mounted on the transport units and the robots, which using electricity, are installed in a transfer body, a high output is required while having a small size, and mass production of high-power small electric motors and generators (electric devices) is required.

However, each of iron cores of the electric motors and the generators according to the related art is constituted by teeth that are protrusions and a slot having a groove. Here, the slot is provided in the form of a groove so that a winding is wound.

In addition, in the case of a general three-phase winding according to the related art, the winding is wound in order of A+, B−, C+, A−, B+, and C− in the groove, and windings B− and C+ having different phases are installed between the windings A+ and A−, each of which has one phase of the three-phase winding, to cross each other at an end portion of the winding. As a result, a space for the winding may be narrowed to deteriorate productivity.

Thus, it is urgent to develop electric motors and generators, which are capable of saving energy with high efficiency according to the use of the electric motor and the generator, satisfying requirement of a high output per unit weight, and being mass-produced through the automated process.

(Patent Document 1) KR10-1027935 B
(Patent Document 2) US20150069875 A1
(Patent Document 3) KR10-2007-0070355 A
(Patent Document 4) KR10-2003-0054753 A
(Paper 1) Comparison Between Double Air Gap Vernier Motor with no inner Stator Excitation and Single Air Gap Machine with no Inner Stator (Society for Electrical Machinery and Energy Conversion Systems, The Fall Conference of The Korean Institute of Electrical Engineers, 2015)
(Paper 2) Analysis of a PM Vernier Motor With Spoke Structure (IEEE TRANSACTIONS ON INDUSTRY APPLICATIONS, VOL. 52, NO. 1, JANUARY/FEBRUARY 2016)
(Paper 3) Analysis of a Vernier Motor with Concentrated Windings (IEEE TRANSACTIONS ON MAGNETICS, VOL. 49, NO. 5, MAY 2013)

DISCLOSURE OF THE INVENTION

Technical Problem

An object of the present invention is to provide a rotating electric device such as an electric motor and a generator, which significantly improves output power per unit weight, realizes high efficiency, and is easily manufactured in order to solve the above problems and requirements.

Technical Solution

The present invention is invented to achieve the above object and discloses a rotating electric device including: an outer stator (210) including an outer stator iron core (211) having a plurality of outer stator winding slots (213) defined in an inner circumferential surface thereof at a predetermined interval in a circumferential direction and an outer winding (510) wound around outer stator iron core teeth (218) that is relatively formed by a pair of outer stator winding slots (213) adjacent to each other; an inner stator (220) including an inner stator iron core (221) having a plurality of inner stator winding slots (223) defined in an outer circumferential surface thereof at a predetermined interval in the circumferential direction; and a rotor (300) having a first air gap (610) with respect to the outside and a second air gap (620) with respect to the inside between the outer stator (210) and the inner stator (220), the rotor (300) being rotatably installed so that a plurality of rotor iron cores (340) and a plurality of permanent magnets (330) are coupled to each other in the circumferential direction in a state in which each of the plurality of rotor iron cores (340) are disposed between the permanent magnets (330), wherein the outer stator iron core (211) has at least one outer stator iron core slot (212) defined in the inner circumferential surface thereof so as to be concave between the pair of outer stator winding slots (213) adjacent to each other, and the inner stator iron core (221) has at least one inner stator iron core slot (222) defined in the outer circumferential surface thereof so as to be concave between the pair of inner stator winding slots (223) adjacent to each other.

The outer winding (510) may be installed inside the outer stator winding slots (213), and the outer stator winding slots (213) may be provided in three times in the outer stator (210) to apply or generate three-phase power.

In the outer stator winding slots (213), at least a portion of an outer stator winding slot extension part (214) that expands a winding area may further extend from a surface thereof facing the rotor (300) in the circumferential direction.

The outer stator iron core (211) may be divided into a plurality of parts in the circumferential direction, and the divided outer stator iron cores (211) are coupled to each other in the circumferential direction to provide a cylindrical shape, and each of the divided outer stator iron cores (211) may be provided by winding the outer winding (510) around each of the outer stator winding slots (213).

The rotating electric device may further include a housing (100) to which the outer stator (210) is fixed, wherein a position sensor (700) for sensing a rotation position of the rotor (300) may be installed at each of a rotating shaft (310) of the rotor (300) and the housing (100).

The inner stator iron core slots (222) may be defined in the middle of the outer stator iron core teeth (218), and N-poles and S-poles (→ ←) of the plurality of permanent magnets (330) of the rotor (300) may be alternately installed in the circumferential direction between the rotor iron cores (340) so that the rotor (300) rotates in a predetermined direction or generates electricity due to electromagnetic interaction of magnetic flux by three-phase power applied or induced to the outer winding (510) of the outer stator (210).

There may be a discrepancy in the positions of outer stator iron core teeth (218) contacting the first air gap (610) and inner stator iron core teeth (219) contacting the second air gap (620) so that magnetic flux of the outer stator (210) smoothly passes through the permanent magnet (330) and the rotor iron core (340) of the rotor (300) to the inner stator (220).

The inner stator (220) may further include an inner winding (520) wound around each inner stator iron core tooth (219) that is relatively provided by a pair of inner stator winding slots (223) adjacent to each other.

The inner winding (520) may be installed inside the inner stator winding slots (223), and the inner stator winding slots (223) may be provided in three times in the inner stator (220) to apply or generate the three-phase power.

The inner stator iron core (221) may be divided into a plurality of parts in the circumferential direction, and the divided inner stator iron cores (221) may be coupled to each other in the circumferential direction to provide a cylindrical shape, and the inner stator iron core (221) may be provided by winding the inner winding (520) around each of the inner stator winding slots (223).

The rotating electric device may further include a housing (100) to which the outer stator (210) is fixed, wherein at least one end of both ends of the rotor (300) may be connected to the rotating shaft (310) of the rotor (300) and coupled to a rotor central shaft hub (380) installed inside the housing (100).

The housing (100) may be provided with an inner support (400) supporting the inner stator (220) so that the rotor (300) rotates while maintaining the first air gap (610) and the second air gap (620), and the inner support (400) may rotatably support the rotor central shaft hub (380) by an inner support outer bearing (921).

The housing (100) may be provided with an inner support (400) supporting the inner stator (220) so that the rotor (300) rotates while maintaining the first air gap (610) and the second air gap (620), and a portion of an end of the inner support (400) may be inserted into the rotor central shaft hub (380), and the inner support (400) may rotatably support the rotor central shaft hub (380) by an inner support outer bearing (921) installed in the inserted portion.

The housing (100) may have an opening (121) through which the rotating shaft (310) is exposed to the outside, and the rotating shaft (310) may be rotatably supported by one or more shaft support bearings (911, 912) installed in the housing (100).

The rotating electric device may further include a housing (100) to which the outer stator (210) is fixed, wherein at least one end of both ends of the rotor (300) may be connected to the rotating shaft (310) of the rotor (300) and coupled to a rotor horizontal hub (381) protruding to the outside of the housing (100), and an outer circumferential surface of the rotor horizontal hub (381) may be rotatably supported by a rotor horizontal hub bearing (923) installed in the housing (100).

The housing (100) may be provided with an inner support (400) supporting the inner stator (220) so that the rotor (300) rotates while maintaining the first air gap (610) and the second air gap (620).

The housing (100) may be provided with an inner support (400) supporting the inner stator (220) so that the rotor (300) rotates while maintaining the first air gap (610) and the second air gap (620), and a portion of an end of the inner support (400) may be inserted into the rotor horizontal hub (381), and the inner support (400) may rotatably support the rotor horizontal hub (381) by a rotor horizontal hub bearing (923) installed in the inserted portion.

The rotating electric device may further include a housing (100) to which the outer stator (210) is fixed, wherein the rotor (300) may include an extension part (320) having one end coupled to a hub part (380) connected to the rotating shaft (310) of the rotor (300) and the other end rotatably supported by bearings (924, 925) installed in the housing (100).

The bearings rotatably supporting the extension part (320) may include an inner support bearing (925) installed on an inner circumferential surface of the extension part (310) or a rotor side surface bearing (924) installed on an end of the extension part (320) and an inner surface of the housing (100).

The outer stator winding slots (213) may be provided in $3n$ slots (n is a natural number greater than or equal to 2) in the outer stator (210) to apply or generate the three-phase power, and the outer windings (510) wound on the outer stator winding slots (213) may be provided as $A_1$ to $A_n$ windings, $B_1$ to $B_n$ windings, and $C_1$ to $C_n$ windings, in which the three-phase power is connected in order of A, B and C with respect to the respective outer stator winding slots 213 in the circumferential direction.

The $A_1$ to $A_n$ windings may be connected to in series or parallel to each other, the $B_1$ to $B_n$ windings may be connected to in series or parallel to each other, and the $C_1$ to $C_n$ windings may be connected to in series or parallel to each other.

The inner stator (220) may further include an inner winding (520) wound around each inner stator iron core tooth (219) that is relatively provided by a pair of inner stator winding slots (223) adjacent to each other, the inner stator winding slots (223) may be provided in $3n$ slots (n is a natural number greater than or equal to 2) in the inner stator (220) to apply or generate the three-phase power, and the inner windings (520) wound around the inner stator winding slots (223) may be provided as $a_1$ to $a_n$ windings, $b_1$ to $b_n$ windings, and $c_1$ to $c_n$ windings, in which the three-phase power is applied in order of a, b and c with respect to the respective inner stator winding slots (223) in the circumferential direction.

The $a_1$ to $a_n$ windings may be connected to in series or parallel to each other, the $b_1$ to $b_n$ windings may be connected to in series or parallel to each other, and the $c_1$ to $c_n$ windings may be connected to in series or parallel to each other.

The outer windings (510) and the inner windings (520) correspond to the three-phase power, the $A_1$ to $A_n$ windings and the a1 to an windings may be connected to each other in pairs, and the pair of $A_n$ and an windings are connected in series or parallel to each other, the $B_1$ to $B_n$ windings and the $b_1$ to $b_n$ windings are connected to each other in pairs, and the pair of $B_n$ and bn windings may be connected in series or parallel to each other, and the $C_1$ to $C_n$ windings and the $c_1$ to $c_n$ windings are connected to each other in pairs, and the pair of $C_n$ and $c_n$ windings may be connected in series or parallel to each other.

The present invention discloses a rotating electric device including: a rotor (300) having a cylindrical shape and connected to a rotating shaft (310) of which at least one end of both ends transmits rotational force to the outside; and one or more stators (210, 220) installed with two air gaps (610, 620) respectively defined in outer and inner circumferential surfaces of the rotor (300), wherein the stators (210, 220) includes: an outer stator (210) installed with an outer circumferential surface of the rotor (300) in a first air gap (610); and an inner stator (220) installed with an inner circumferential surface of the rotor (300) in a second air gap (620).

Advantageous Effects

The rotating electric device according to the present invention, i.e., the electric motor or the generator may include the plurality of winding slots formed at the predetermined interval in the circumferential direction and the inner and outer stators, each of which has one or more iron slots that are concave at the relatively protruding portion by the pair of winding slots adjacent to each other to significantly improve the output power per weight of the rotating electric device.

In addition, in the rotating electric device, the electric motor, or the generator according to the present invention, the outer and inner stators may be respectively disposed inside and outside the rotor to increase in power generation area, thereby significantly improving the output power per weight of the rotating electric device.

Furthermore, the magnetic flux of the outer stator may well pass through the rotor to the inner stator, and the permanent magnet and the rotor iron core of the rotor may be disposed to concentrate the magnetic flux. Therefore, the air gap magnetic flux density may increase to increase in output power per unit volume.

In addition, in the rotating electric device, the electric motor, or the generator according to the present invention, at least one of the outer stator or the inner stator may be formed by the coupling of the plurality of stator members around which the coil is wound. Therefore, the winding fill factor of the coil wound around the stator and the manufacturing efficiency of the rotating electric device may be maximized.

In addition, in the rotating electric device according to the present invention, in particular, the electric motor, the position sensor for sensing the rotating position of the rotor may be integrated with the electric motor to simplify the structure thereof and facilitate the use thereof.

BRIEF DESCRIPTION OF THE DRAWINGS

FIGS. 9a to 9c are connection diagrams of one phase of three phases, which illustrate winding connection between an outer winding and an inner winding according to the embodiment of FIGS. 1 and 2.

FIGS. 10a and 10b are connection diagrams of one phase of three phases, which illustrate winding connection when only the outer winding is provided, in the rotating electric device according to the embodiment of FIGS. 3 and 4.

FIG. 11 is a conceptual view illustrating coupling between the rotor and a position sensor, which are used in embodiments of the present invention.

MODE FOR CARRYING OUT THE INVENTION

Figure 1:
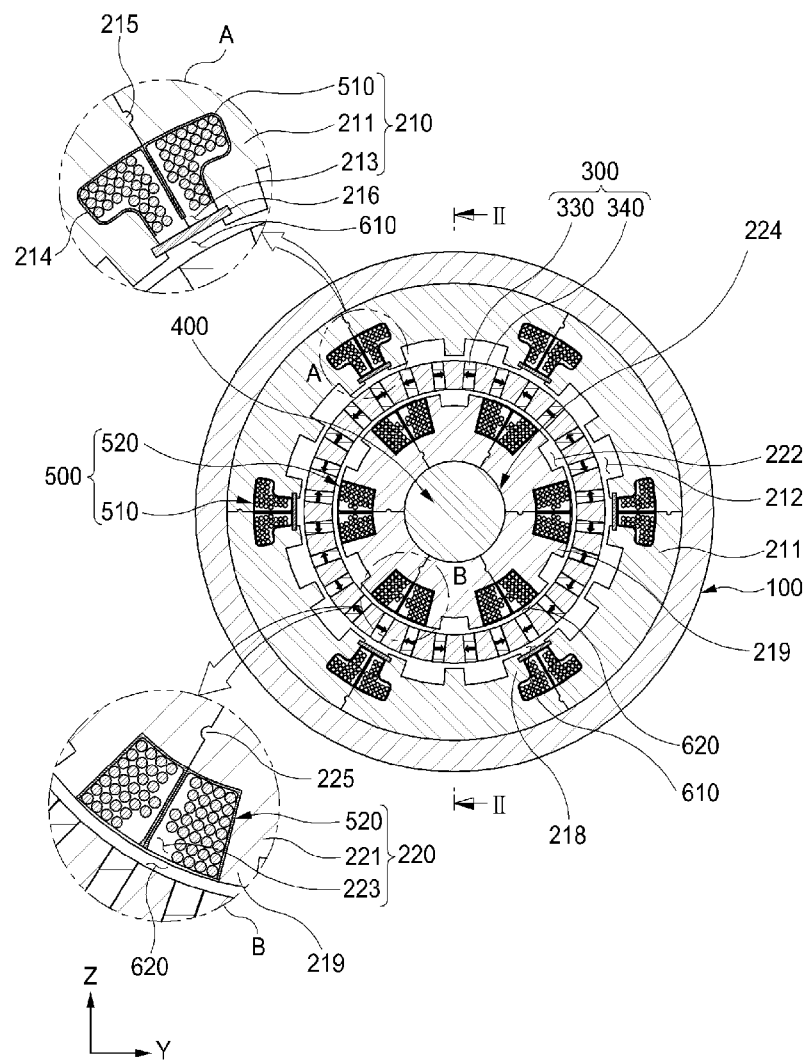
FIG. 1 is a transverse cross-sectional view of a rotating electric device according to a first embodiment of the present invention.

Hereinafter, a rotating electric device according to the present invention will be described as follows with reference to the accompanying drawings.

First, the main subject of the present invention may be applied to all of rotating electric devices such as electric motors that generate rotational force by applying electricity, generators that rotate to generate electricity, and the like, and the overall structures may be substantially the same as or similar to each other except for the unique operating principle of the electric motor or generator.

Hereinafter, the present invention will be described with reference to embodiments of the electric motor.

An electric motor according to the present invention has a double air gap structure constituted by an outer stator 210, an inner stator 220, and a rotor 300 to generate greater rotational force. The double air gap may include a first air gap 610 defined to generate rotational force between the outer stator 210 and the rotor 300 and a second air gap 620 defined between the inner stator 220 and the rotor 300, and various embodiments may be possible.

Hereinafter, the electric motor and the electric generator according to the present invention will be described with reference to the accompanying drawings and embodiments.

1. First Embodiment

Figure 2:
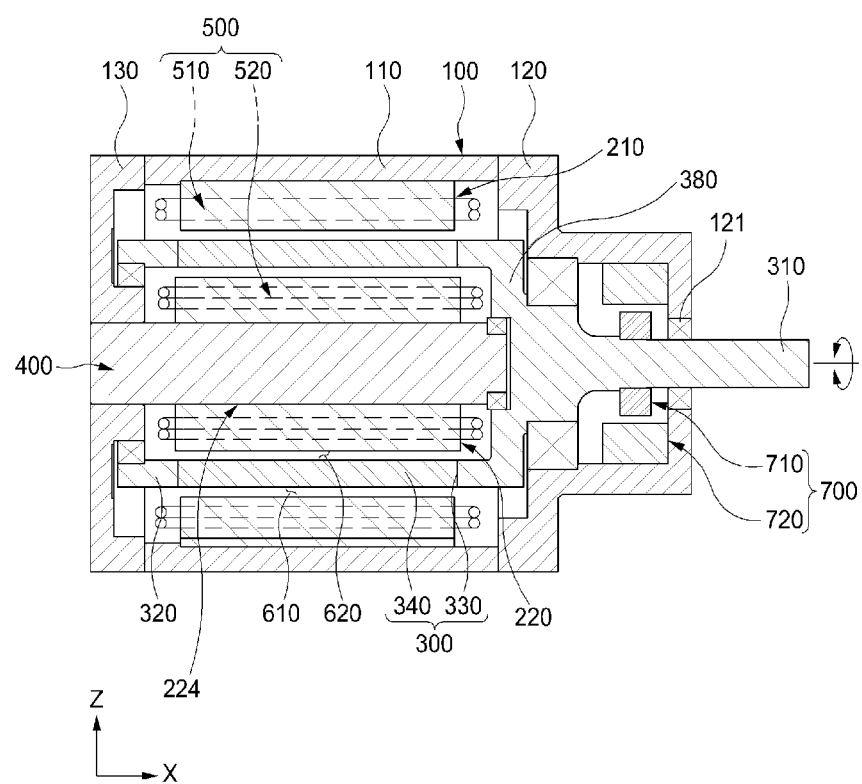
FIG. 2 is a longitudinal cross-sectional view of the rotating electric device of FIG. 1, taken along line II-II.

As illustrated in FIGS. 1 and 2, an electric motor according to a first embodiment of the present invention includes an outer stator 210, an inner stator 220, and a rotor 300.

Outer Stator

The outer stator 210 may include an outer stator iron core 211 in which a plurality of outer stator winding slots 213 are defined in an inner circumferential surface thereof at a predetermined interval in a circumferential direction and an outer winding 510 wound with respect to outer stator iron core teeth 218 that are relatively disposed by the outer stator winding slots 213 adjacent to each other and also may be variously configured.

The outer stator iron core 211 may be configured so that the plurality of outer stator winding slots 213 are defined in the inner circumferential surface thereof at a predetermined interval in the circumferential direction and also may be variously configured.

Here, the outer stator winding slots 213 may be grooves that are defined in the inner circumferential surface of the outer stator 210 to make a pair with the outer stator winding slots 213 adjacent to each other so that the outer winding 510 is wound therearound and may have various structures according to a wound structure of the outer winding 510.

For example, the outer stator winding slots 213 may be provided in three times, for example, six in the inner circumferential surface of the outer stator 210 in the circumferential direction so that three-phase power is applied or induced.

Also, each of the outer stator winding slots 213 may preferably have a winding slot extension part 214 of which an inner portion further extends in the circumferential direction, for example, may have a winding slot extension part 214 having an inverted 'T' shape.

The inner portion of the winding slot extension part 214 may further extend in the circumferential direction to increase in winding area.

Particularly, it is preferable that the winding slot extension part 214 is disposed on the outer stator winding slot 213 defined in the inner surface of the outer stator 210 to further extend in the circumferential direction.

A protective member 216 that protects the outer winding 510 wound toward the rotor 300, which will be described, so as to protect the outer winding 510 after the outer winding 510 is wound around the outer stator winding slot 213.

The protective member 216 may be configured to protect the outer winding 510 with respect to the rotor 300 because the outer winding 510 protrudes toward the rotor 300 after the outer winding is wound. The protective member 216 may be installed in a manner that is inserted into a longitudinal direction of the outer stator 210.

Here, in order to facilitate the insertion of the protective member 216, the outer stator 210 may additionally have a protective member insertion slot 217.

The protective member insertion slot 217 may have a structure that facilitates the insertion of the protective member 216 and may have various structures and shapes.

In addition, a sheet made of an electrical insulating material may be disposed on an inner surface of the outer stator winding slot 213 so as to be electrically insulated from the outer stator 210 made of a conductive material.

Also, the outer stator 210 may be made of any material as long as the material is capable of generating electric fields by power applied to the outer winding 510 wound around the outer stator winding slot 213. For example, the outer stator 210 may have a structure in which a plurality of iron plates are stacked, i.e., a stacked iron core structure and thus may be made of various materials and have various structures.

A predetermined air gap, i.e., a first air gap 610 in which electrical energy is converted into mechanical energy may be defined between the outer stator 210 and the rotor 300, i.e., between the inner circumferential surface of the outer stator 210 and the outer circumferential surface of the rotor 300 (with respect to the outside of the rotor 300).

The first air gap 610 may have an appropriate size according to the design of the air gap defined to minimize an interference of the outer stator 210 from the rotation of the rotor 300.

It is preferable that the outer stator 210 is configured so that one or more outer stator iron core slots 212 are concavely defined in an inner circumferential surface of a protrusion that is relatively provided by the pair of outer stator winding slots 213 adjacent to each other, i.e., the outer stator iron core teeth 218.

That is, the outer stator iron core slots 212 may be defined to be concave between the pair of outer stator winding slots 213 adjacent to each other.

Also, the one or more outer stator iron core slots 212 may be arranged at a predetermined interval between the plurality of outer stator winding slots 213, and each of the outer stator iron core slots 212 may be defined in the longitudinal direction of the outer stator 210.

It is confirmed that the outer stator iron core slots 212 significantly increases in magnitude of force relative to an area of the outer circumferential surface of the rotor 300 according to the simulation. Thus, it is preferable that the outer stator iron core slots 212 are arranged at a predetermined interval between the plurality of outer stator winding slots 213, and each of the outer stator iron core slots 212 is defined in the longitudinal direction of the outer stator 210.

It is preferable that each of the outer stator iron core slots 212 has a depth less than that of each of the outer stator winding slots 213 defined from one surface of the outer stator 210 toward the rotor 300.

Also, the outer stator iron core slots 212 may have various numbers and widths according to the design thereof.

The outer winding 510 may be configured to be wound around the protrusion that is relatively provided by the pair of outer stator winding slots 213 adjacent to each other, i.e., the outer stator iron core teeth 218 and also may be variously configured according to a winding method of the coil.

For example, a coil to which power corresponding to one of three-phase power is applied (induced in the case of the generator) may be wound around the outer stator iron core teeth 218 provided by the pair of outer stator winding slots 213 adjacent to each other with respect to six outer stator winding slots 213 so that the three-phase power is applied (induced in the case of the generator).

Inner Stator

The inner stator 220 may include an inner stator iron core 221 in which a plurality of inner stator winding slots 223 are defined in an outer circumferential surface thereof at a predetermined interval in a circumferential direction and an inner winding 520 wound with respect to inner stator iron core teeth 219 that are relatively disposed by the inner stator winding slots 223 adjacent to each other and also may be variously configured.

The inner stator 220 has a second air gap 620 that will be described below and is installed inside the rotor 300. The inner stator 220 may be variously configured according to whether the inner winding 520 is wound.

The inner stator iron core 221 may be configured so that the plurality of inner stator winding slots 223 are defined in the outer circumferential surface thereof at a predetermined interval in the circumferential direction and also may be variously configured.

Here, the inner stator winding slots 223 may be grooves that are defined in the inner circumferential surface of the inner stator 220 to make a pair with the inner stator winding slots 223 adjacent to each other so that the inner winding 520 is wound therearound and may have various structures according to a wound structure of the inner winding 520.

For example, the inner stator winding slots 223 may be provided in three times, for example, six in the outer circumferential surface of the inner stator 220 so that the three-phase power is applied (in the case of the generator, power is generated).

Particularly, it is preferable that the inner stator winding slots 223 are defined to correspond to the number or position of the outer stator winding slots 213.

In more detail, it is preferable that the outer stator iron core teeth 218 and the inner stator iron core teeth 219, which contact the first air gap 610, are alternately disposed in a radial direction so that magnetic flux of the outer stator 210 smoothly passes through a permanent magnet 330 and a rotor iron core 340 of the rotor 300.

That is, when a virtual line is drawn from a center of the rotor 300 in the radial direction, it is preferable that the outer stator iron core teeth 218 are disposed in a straight line with the inner stator iron core slots 222.

That is to say, in the relative arrangement of the outer stator 210 and the inner stator 220, in order to allow the rotor 300 to generate rotational force in one direction, the outer stator iron core teeth 218 contacting the first air gap 610 and the inner stator iron core teeth 219 contacting the second air gap 620 are alternately disposed, i.e., the outer stator iron core teeth 218 match the inner stator iron core slots 222 when the virtual line is drawn from the center of the rotor 300 in the radial direction so that the magnetic flux of the outer stator 210 smoothly passes through the permanent magnet 330 and the rotor iron core 340 of the rotor 300 to the inner stator 220.

In addition, a sheet made of an electrical insulating material may be disposed on an inner surface of the inner stator winding slot 223 so as to be electrically insulated from the inner stator 220 made of a conductive material.

Also, the inner stator 220 may be made of any material as long as the material is capable of generating electric fields by power applied to the inner winding 520 wound around the inner stator winding slot 223. For example, the inner stator 220 may have a structure in which a plurality of iron plates are stacked and thus may be made of various materials and have various structures.

A predetermined air gap, i.e., the second air gap 620 in which electrical energy is converted into mechanical energy may be defined between the inner stator 220 and the rotor 300, i.e., between the outer circumferential surface of the inner stator 220 and the inner circumferential surface of the rotor 300 (with respect to the inside of the rotor 300).

The second air gap 620 may have an appropriate size according to the design of the air gap defined to minimize an interference of the inner stator 220 from the rotation of the rotor 300.

It is preferable that the inner stator 220 is configured so that one or more inner stator iron core slots 222 are concavely defined in an outer circumferential surface of a protrusion that is relatively provided by the pair of inner stator winding slots 223 adjacent to each other.

That is, the one or more inner stator iron core slots 222 may be defined to be concave in the outer circumferential surface of the inner stator iron core 221 between the pair of inner stator winding slots 223 adjacent to each other.

Also, the one or more inner stator iron core slots 212 may be arranged at a predetermined intervals between the plurality of inner stator winding slots 223, and each of the inner stator iron core slots 223 may be defined in the longitudinal direction of the inner stator 220.

It is confirmed that the inner stator iron core slots 222 significantly increases in magnitude of force (magnitude of generated power in the case of the generator) relative to an area of the inner circumferential surface of the rotor 300 according to the simulation. Thus, it is preferable that the inner stator iron core slots 222 are arranged at a predetermined interval between the plurality of inner stator winding slots 223, and each of the inner stator iron core slots 222 is defined in the longitudinal direction of the inner stator 220.

It is preferable that each of the inner stator iron core slots 222 has a depth less than that of each of the inner stator winding slots 223 defined from one surface of the inner stator 220 toward the rotor 300.

Also, the inner stator iron core slots 222 may have various numbers and widths according to the design thereof.

The inner winding 520 may be configured to be wound around the protrusion that is relatively provided by the pair of inner stator winding slots 223 adjacent to each other, i.e., the inner stator iron core teeth 219 and also may be variously configured according to a winding method of the coil.

For example, in the winding and the arrangement structure of the inner stator 520, a coil to which power corresponding to one of three-phase power is applied may be wound around the protrusion provided by the pair of inner stator winding slots 223 adjacent to each other with respect to six inner stator winding slots 223 so that the three-phase power is applied (generated in the case of the generator).

Rotor

The rotor 300 has the first air gap 610 with respect to the outside, i.e., between the outer stator 210 and the rotor 300 and the second air gap 620 with respect to the inside, i.e., between the inner stator 220 and the rotor 300. The plurality of rotor iron core 340 and the plurality of permanent magnets 330 are coupled to each other in the circumferential direction between the rotor iron cores 340 so as to be rotatably installed, and also, the rotor 300 may be variously configured.

For example, the rotor 300 may include a plurality of rotor iron cores 340 and a plurality of permanent magnets 330, which are coupled to each other in the circumferential direction.

The inner stator iron core slots 222 are respectively positioned in the middle of outer stator iron core teeth 218, and N-poles and S-poles (→ ←) of the plurality of permanent magnets 330 of the rotor 300 are alternately installed in the circumferential direction between the rotor iron cores 340 (in the drawings, expressed as arrows → and ← based on magnetic poles) so that the rotor 300 rotates in a predetermined direction or generates electricity due to electromagnetic interaction of the magnetic flux by the three-phase power applied or induced to the outer winding 510 of the outer stator 210 and the inner winding 520 of the inner stator 220.

For example, the rotor 300 may have various shapes such as including a cylindrical portion which has a cylindrical shape and in which a plurality of rotor iron cores 340 and a plurality of permanent magnets 330 are coupled to each other in the circumferential direction between the rotor iron cores 340 and a rotating shaft 310 for transmitting rotational force to the outside—the generator has a rotating shaft 310 that allows the rotor 300 to rotate by external mechanical power.

Also, the cylindrical portion may be determined in arrangement and number of the permanent magnets 340 according to the design of the outer circumferential surface thereof.

Particularly, the cylindrical portion may define a cylindrical shape as a whole, and the rotor iron cores 340 and the permanent magnets 330 may be sequentially disposed on the cylindrical portion.

Here, it is preferable that the direction of the magnetic pole is defined with ← → polarities in the circumferential direction to improve an output power by concentrating the magnetic flux.

The electric motor may include a housing 100 to which the outer stator 210 is fixed.

Also, an inner support 400 for supporting the inner stator 220 so that the rotor 300 is rotatable between the first air gap 610 and the second air gap 620 may be further installed in the housing 100.

The inner support 400 may be configured to support the inner stator 220 so that the rotor 300 is rotatable in the first air gap 610 and the second air gap 620 and also may be variously configured such as being installed as a member that is integrated with or separated from the inner stator.

For this, the inner support 400 may be fixedly installed in the housing 100 so that the inner support 400 is inserted into the rotor 300 to rotatably support the rotor 300.

Particularly, the inner support 400 may be variously configured such as being installed to pass through a throughhole defined in the longitudinal direction of the inner stator 220 so that the inner support 400 is inserted into the inner stator 220, which will be described later, to support the inner stator 220.

Also, the inner support 400 may have one end (a left end in the drawing) fixedly installed in the housing 100 and the other end (a right end in the drawing) on which an inner support outer bearing 921 or a rotator horizontal hub bearing 923 is installed to support the rotor to be rotatable directly or indirectly.

For example, the inner support 400 may be installed in the housing 100 in various methods such as being integrally or detachably assembled so as not to rotate with respect to the housing 100.

Also, the inner support 400 may have one end (a left end in the drawing) coupled to the housing 100 and inserted and installed into the rotor 300, and the rotor 300 may be directly or indirectly supported on the other end (a right end in the drawing) of the inner support 400.

The inner support 400 may have an outer diameter less than an inner diameter of the rotor 300 (or the rotor 300 or a rotor horizontal hub 381, which will be described later) so as not to adequately support the rotor 300 (or the rotor 300 or the rotor horizontal hub 381, which will be described later).

Thus, an auxiliary support 410 that expands the outer diameter may be coupled to an end of the inner support 400 so that the inner support 400 rotatably supports the rotor 300 (or the rotor 300 or the rotor horizontal hub 381, which will be described later) by the rotator horizontal hub bearing 923.

The electric motor according to the first embodiment of the present invention includes the housing 100.

The housing 100 may be configured to support the rotor 300 that will be described below as well as fixedly install the outer stator 210 and the like.

Particularly, the housing 100 may have various structure such as a structure in which rotatable support structures such as bearing are installed at a plurality of points according to a rotatable support structure of the rotor 300 that will be described later.

For example, the housing may include a housing body 110 to which the outer stator is coupled therein; and housing members 120 and 130 respectively coupled to both ends of the housing body 110.

That is, the housing body 110 may have various structures and shapes such as an inner circumferential surface having a cylindrical shape so that the outer stator 210 is coupled therein.

The housing members 120 and 130 may be configured to be coupled to both the ends of the housing body 110 and may include a first housing body in which an opening, through which at least a portion of the rotating shaft 310 or the rotor 300 is exposed is defined, and a second housing member coupled to the housing body 110 at a position facing the first housing member 120.

Also, any one of the housing members 120 and 130 may be configured so that at least a portion of the rotor 300 is exposed to the outside.

Particularly, it is preferable that an opening 131 is defined in any one of the housing members 120 and 130 so that the rotating shaft 310 that will be described later transmits rotational force to the outside (in the case of the generator, rotates by external mechanical power).

2. Second Embodiment

With respect to the configuration of the inner stator 220, although the configuration including the inner stator iron core 221 and the inner winding 520 wound around the inner stator iron core 221 is described in the embodiment of FIGS. 1 and 2, various modifications may be possible such as a configuration in which the inner winding 520 is not wound. For example, when the electric motor has a small diameter, a winding operation of the inner winding 520 may be difficult, and the number of coils to be wound may be very small, and thus, it may be hardly expected to increase in output torque (an amount of power to be generated).

Figure 3:
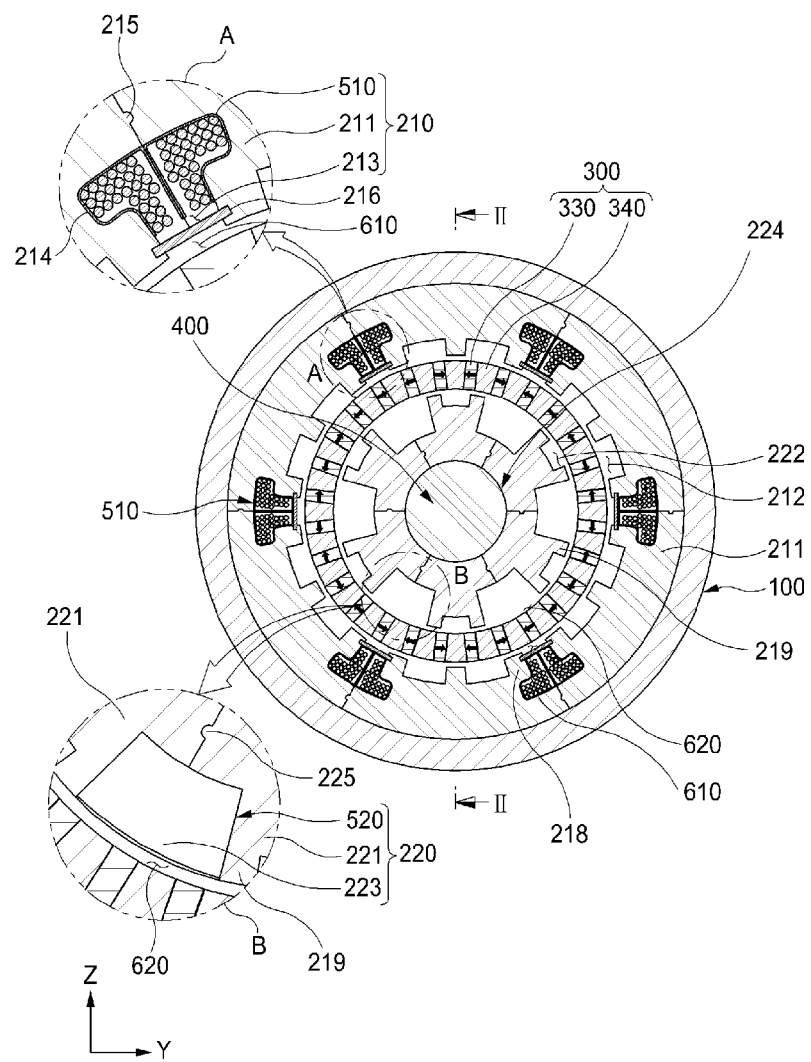
FIG. 3 is a transverse cross-sectional view of a rotating electric device according to a second embodiment of the present invention.
Figure 4:
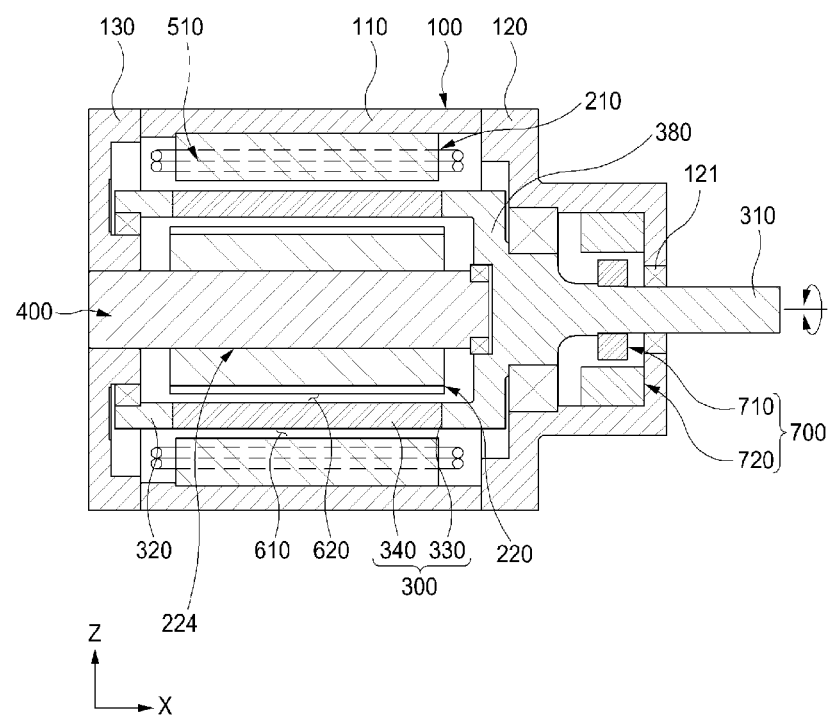
FIG. 4 is a longitudinal cross-sectional view of the rotating electric device of FIG. 3, taken along line II-II.

That is, as illustrated in FIGS. 3 and 4, in an electric motor according to a second embodiment of the present invention, the inner stator 220 may be constituted by only the iron cores without the inner winding 520 in the configuration according to the first embodiment of the present invention.

In summary, FIGS. 1 and 2 illustrate a case in which all of the outer winding 510 and the inner winding 520 are installed as described above according to the first embodiment, and FIGS. 3 and 4 illustrate a case in which only the outer winding 510 is installed as described above according to the second embodiment. When all of the outer winding 510 and the inner winding 520 are installed, although the winding is somewhat complicated, it may have an advantage of reducing a loss due to a wide cross-sectional area of the winding.

The electric motor according to the second embodiment of the present invention have the same as that according to the first embodiment except that the inner winding 520 is not wound, and thus, detailed description thereof will be omitted.

3. Detailed Embodiment Depending on Other Configurations

Hereinafter, detailed embodiment of other configurations will be described. For convenience, only detailed or modified portions will be described in the description of each embodiment.

Embodiment of Rotor

The rotor 300 may be variously configured according to the coupling structure with the rotating shaft 310 and the rotatable support structure with respect to the housing 100.

As an embodiment of the rotor 300, as illustrated in FIGS. 1 and 2 (see reference numerals of 12a and 12b), in the rotor 300, a rotor central shaft hub 380 connected to the rotating shaft 310 of the rotor 300 and installed in the housing 100 may be coupled to at least one end of both ends of the rotor 300.

The rotor central shaft hub 380 may be variously configured such as being connected to the rotating shaft 310 of the rotor 300 at at least one end of both the ends of the rotor 300 and installed in the housing 100.

For example, the rotor central shaft hub 380 may be configured to be coupled to at least one end of both the ends of the rotor 300 to define a cylindrical shape as a whole.

The housing 100 may be provided with an inner support 400 for supporting the inner stator 220 so that the rotor 300 rotates while maintaining the first air gap 610 and the second air gap 620.

The inner support 400 may be configured to support the inner stator 220 so that the rotor 300 rotates while maintaining the first air gap 610 and the second air gap 620 and also may be variously configured.

Also, the inner support 400 may rotatably support the rotor central shaft hub 380 by an inner support outer bearing 921.

The rotor central shaft hub 380 may have various support structures by the inner support 400. As illustrated in FIGS.

2 and 4 (FIGS. 12a and 12b), a portion of the end thereof may be inserted into the rotor central shaft hub 380, and thus, the rotor central shaft hub 380 may be rotatably supported by the inner support outer bearing 921 installed in the inserted portion.

For another example, in the support structure of the rotor central shaft hub 380 by the inner support 400, an inner circumferential surface of the rotor central shaft hub 380 may be supported so that the rotor central shaft hub 380 is rotatably supported by the inner support outer bearing 921.

The housing 100 may have an opening 121 through which the rotating shaft 310 is exposed to the outside in consideration that the rotor central shaft hub 380 is installed in the housing 100.

Also, the rotating shaft 310 may be rotatably supported by one or more shaft support bearings 911 and 912 installed in the housing 100, for example, a first shaft support bearing 911 and a second shaft support bearing 912.

Here, it is preferable that a portion disposed inside the housing 100, i.e., a coupling part 313 coupled to the rotor central shaft hub 380 has an outer diameter greater than that of a portion that protrudes to the outside of the housing 100 so as to be smoothly supported by the first shaft support bearing 911.

Here, the first housing member 120 of the housing 100 may have a shape corresponding to an outer appearance of the coupling part 313.

Figure 5:
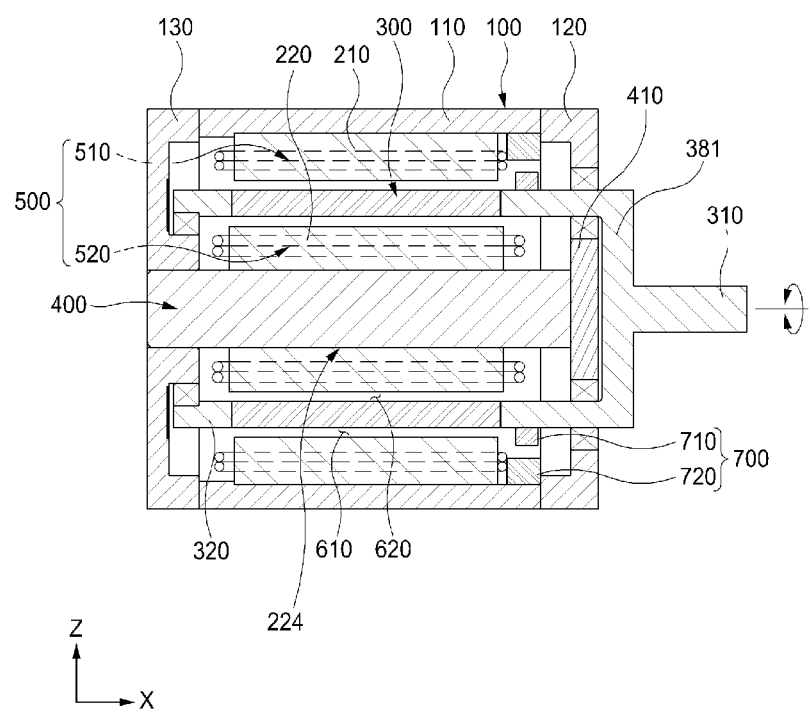
FIGS. 5 and 6 are longitudinal cross-sectional views illustrating modified examples of a rotor of each of the rotating electric devices illustrated in FIGS. 2 and 4.
Figure 6:
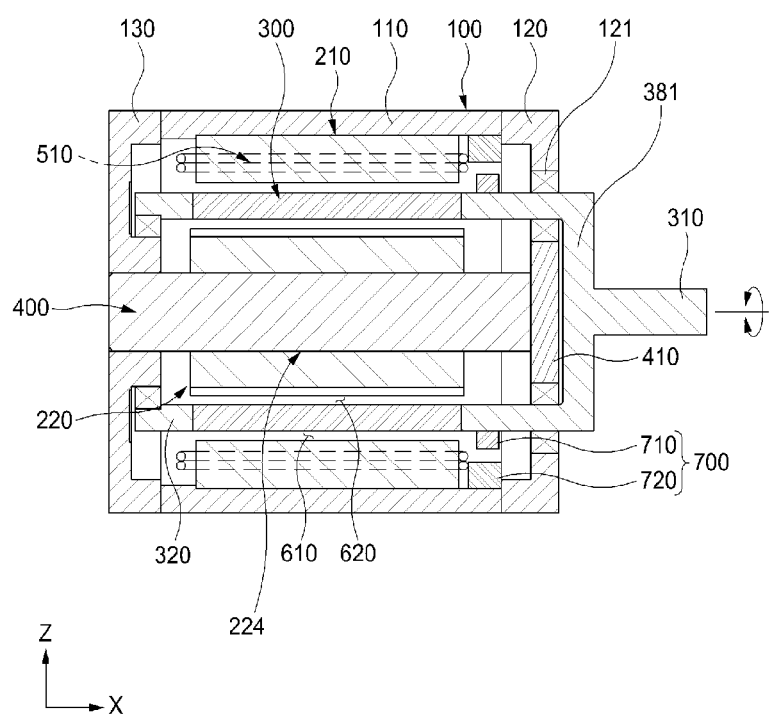

For another example of the rotor 300, as illustrated in FIGS. 5 and 6 (see reference numerals 12c and 12d), in the rotor 300, at least one end of both ends of the rotor 300 may be connected to the rotating shaft 310 of the rotor 300 and coupled to a rotor horizontal hub 381 that protrudes to the outside of the housing 100.

The rotor horizontal hub 381 may be various configured such as being connected to the rotating shaft 310 of the rotor 300 at at least one end of both the ends of the rotor 300 and protruding to the outside of the housing 100.

For example, the rotor horizontal hub 381 may be configured to be coupled to at least one end of both the ends of the rotor 300 to define a cylindrical shape as a whole.

Here, an outer circumferential surface of the rotor horizontal hub 381 may be rotatably supported by a rotor horizontal hub bearing 923 installed in the housing 100.

As described above, the housing 100 may be provided with an inner support 400 for supporting the inner stator 220 so that the rotor 300 rotates while maintaining the first air gap 610 and the second air gap 620.

The inner support 400 may be configured to support the inner stator 220 so that the rotor 300 rotates while maintaining the first air gap 610 and the second air gap 620 and also may be variously configured.

Also, the inner support 400 may rotatably support the rotor horizontal hub 381 by a rotor horizontal hub bearing 923.

The rotor horizontal hub 381 may have various support structures by the inner support 400. For example, a portion of the end thereof may be inserted into the rotor horizontal hub 381, and thus, the rotor horizontal hub 381 may be rotatably supported by the rotor horizontal hub bearing 923 installed in the inserted portion.

For another example, as illustrated in FIGS. 5 and 6 (FIGS. 12c and 12d), in the support structure of the rotor horizontal hub 381 by the inner support 400, an inner circumferential surface of the rotor horizontal hub 381 may be supported so that the rotor horizontal hub 381 is rotatably supported by the rotor horizontal hub bearing 923.

The rotor 300 may include an extension part 320 having one end (a right portion in the drawing) coupled to the rotor central shaft hub 380 or the rotor horizontal hub 381, which is connected to the rotating shaft 310 of the rotor 300 described above and the other end (a left portion in the drawing) that is rotatably supported by the bearing installed in the housing 100.

The extension part 320 may be a portion that is coupled to the rotor 300 at an end opposite to the end, to which the rotor central shaft hub 380 or the rotor horizontal hub 381 is coupled, so as to be rotatably supported by the bearing installed in the housing 100 and may have a cylindrical shape together with the above-described rotor 300 and a hub part 380 as a whole.

Figure 12A:
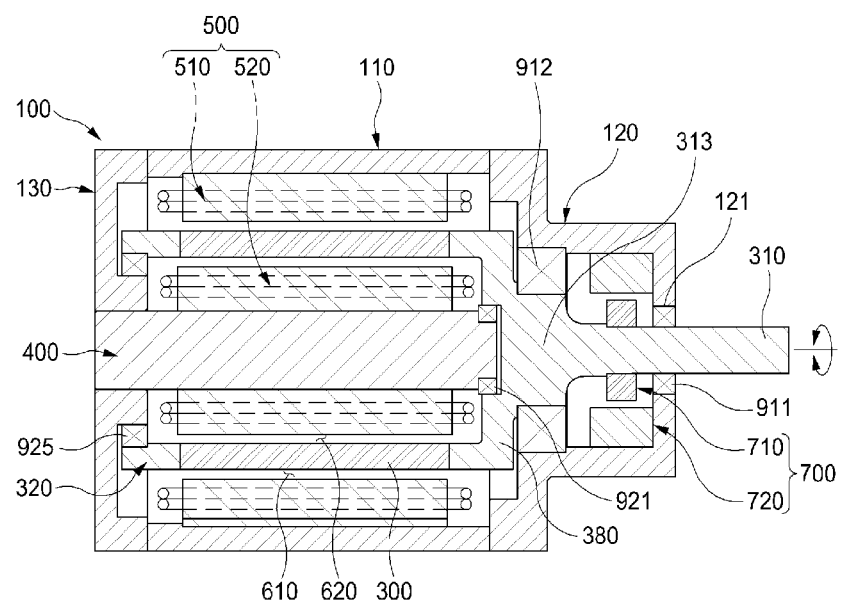
FIGS. 12a to 12d are longitudinal cross-sectional views illustrating a coupled structure between the rotor and a rotation shaft, which are used in embodiments of the present invention.
Figure 12B:
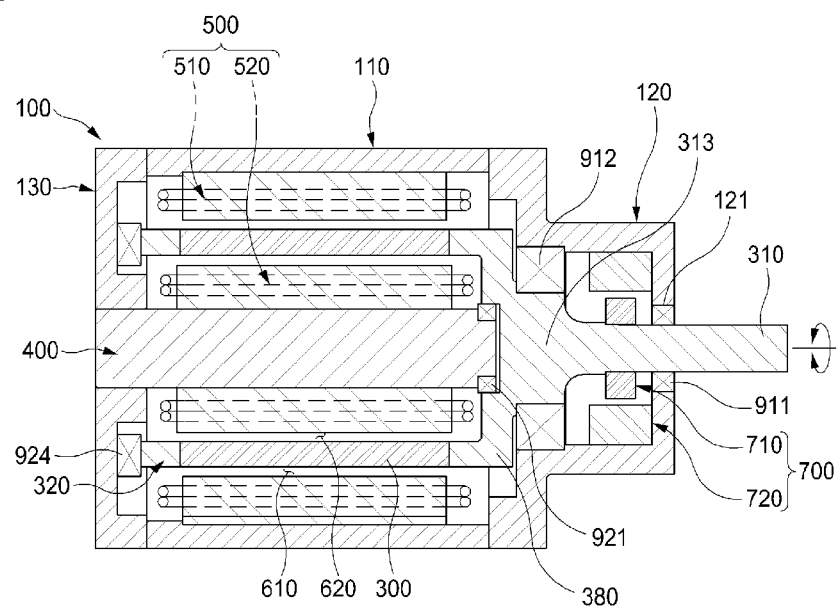
Figure 12C:
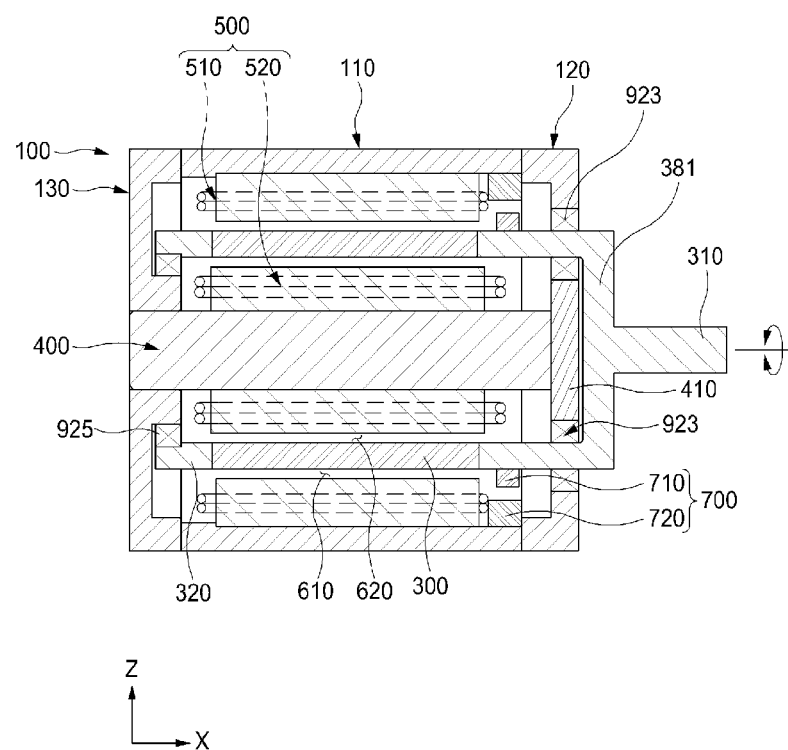
Figure 12D:
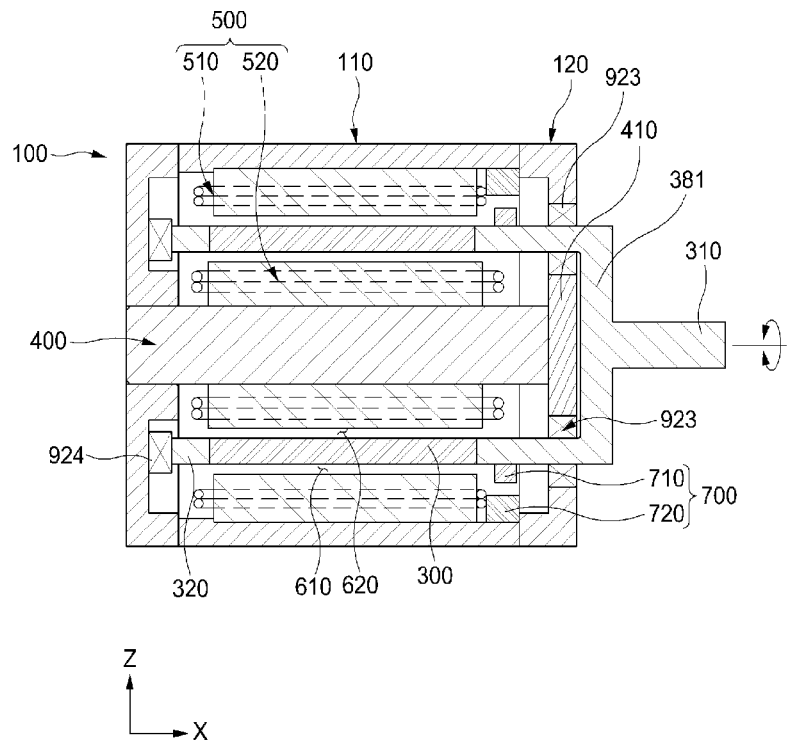

Here, the bearing rotatably supporting the extension part 320 may be installed to the housing 100 to rotatably support the extension part 320. The bearing may be provided as an inner support bearing 925 installed on an inner circumferential surface of the extension part 320 as illustrated in FIGS. 12a and 12c or be provided as a rotor surface bearing 924 installed on an end of the extension part 320 or an inner surface of the housing 100, i.e., rotatably supporting the rotating shaft 310 of the extension part 320 as illustrated in FIGS. 12b and 12d and also may be variously configured.

In summary with reference to FIGS. 2 and 4 to 6, FIGS. 2 and 4 that illustrate the embodiments for the coupling of the rotating shaft 310 may illustrate a case in which a configuration in which the rotating shaft 310 is withdrawn from a center of the electric motor, i.e., the rotor central shaft hub 380 coupled to the rotor 300 inside the housing 100. On the other hand, FIGS. 5 and 6 may illustrate a case in which the rotor horizontal hub 381 extending parallelly from the rotor 300 is exposed to the outside, and then, the rotating shaft 310 is coupled to the rotor horizontal hub 381 that is exposed to the outside.

Here, FIG. 5 illustrates a case in which the outer winding 510 and the inner winding 520 are wound, and FIG. 6 illustrates a case in which only the outer winding 510 is wound.

Embodiments of Iron Cores of Outer Stator and Inner Stator

The iron cores of the outer stator 210 and the inner stator 220 may be various embodiments.

Figure 7A:
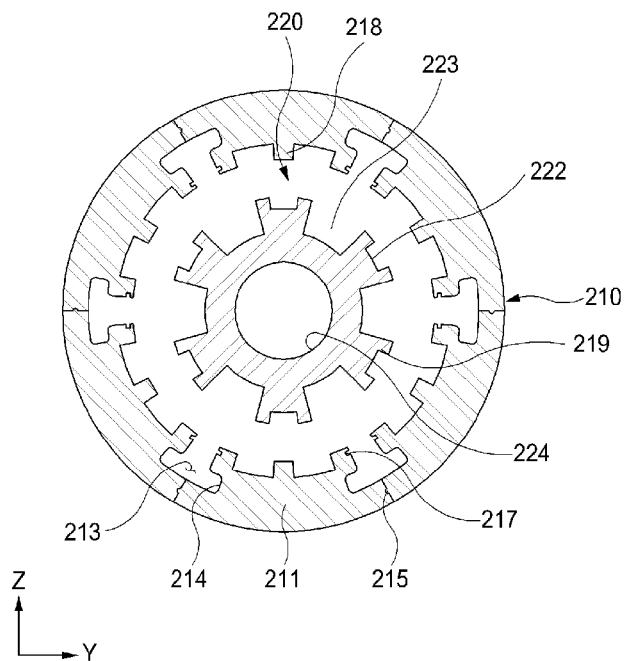
FIGS. 7a to 7c are longitudinal cross-sectional views illustrating modified examples of an iron core of each of an outer stator and an inner stator, which are used in embodiments of the present invention.

As a first embodiment of the iron core structure, as illustrated in FIG. 7a, the outer stator iron core 211 of the outer stator 210 may be divided into a plurality of parts in the circumferential direction, and the inner stator iron core 221 of the inner stator 220 may have an integrally cylindrical shape.

Also, each of the divided outer stator iron cores 211 may be a unit core in which the outer winding 510 is wound around the outer stator winding slot 213, and the divided outer stator iron cores 211 may be sequentially coupled to each other in the circumferential direction to define the cylindrical shape as a whole.

That is, the plurality of divided outer stator iron cores 211 may have fixing structures 215 on both side surfaces that are in close contact with the outer stator iron cores 211 adjacent to each other.

The fixing structures 215 may be provided on the contact surface on which the plurality of divided outer stator iron cores 211 are in close contact with each other and have various structures as a structure for fixing the plurality of outer stator iron cores 211.

Particularly, the fixing structure 215 may include: one or more protrusions protruding from one surface that is in close contact with the outer stator iron core 211 disposed at an adjacent position; recess portions in the other surface, which are defined to correspond to the protrusions.

As described above, the outer stator 210 may have a cylindrical shape by the plurality of divided outer stator iron cores 211. Furthermore, when divided into the outer stator winding slots 213 and coupled to the outer stator iron core 211 that is disposed adjacent in the state in which the outer winding 510 is wound, the outer winding 510 may be easily wound, and also, an overall assembly of the outer stator 210 may be easy.

Figure 7B:
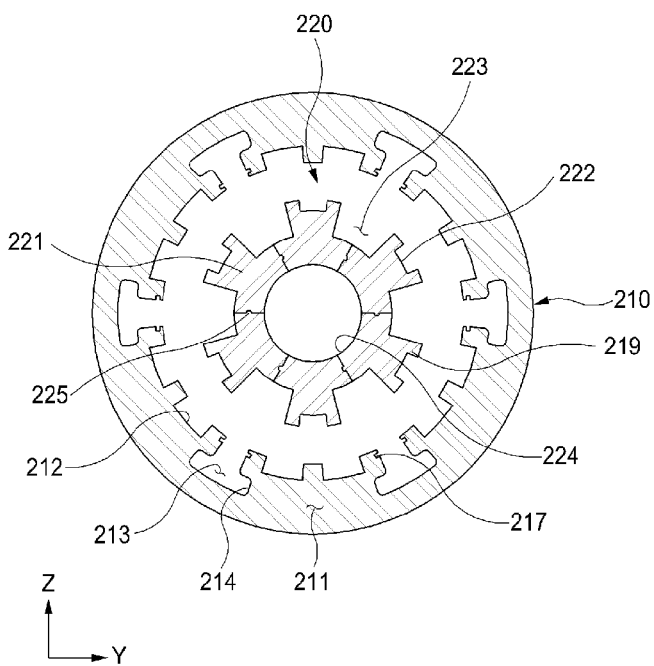

As a second embodiment of the iron core structure, as illustrated in FIG. 7b, the outer stator iron core 211 of the outer stator 210 may have an integrally cylindrical shape, and the inner stator iron core 221 of the inner stator 220 may be divided into a plurality of parts in the circumferential direction.

Also, each of the divided inner stator cores 221 may be a unit core in which the inner winding 520 is wound around the inner stator winding slot 223, and the divided inner stator cores 211 may be sequentially coupled to each other in the circumferential direction to define the cylindrical shape as a whole.

That is, the inner stator iron core 221 may be divided into the plurality of parts in the circumferential direction, and the divided inner stator iron cores 221 may be coupled to each other in the circumferential direction to define a cylindrical shape as a whole.

Also, it is preferable that the divided inner stator iron cores 221 are divided into the inner stator winding slot 223 and coupled to the inner stator iron core 221 that is disposed adjacent in the state in which the inner winding 520 is wound.

For example, the plurality of divided inner stator iron cores 221 may have fixing structures 225 on both side surfaces that are in close contact with the inner stator iron cores 221 adjacent to each other.

The fixing structures 225 may be provided on the contact surface on which the plurality of divided inner stator iron cores 221 are in close contact with each other and have various structures as a structure for fixing the plurality of divided inner stator iron cores 221.

Particularly, the fixing structure 225 may include: one or more protrusions protruding from one surface that is in close contact with the divided inner stator iron core 221 disposed at an adjacent position; recess portions in the other surface, which are defined to correspond to the protrusions.

As described above, the inner stator 220 may have a cylindrical shape by the plurality of divided inner stator iron cores 221. Furthermore, when divided into the inner stator winding slots 223 and coupled to the inner stator iron core 221 that is disposed adjacent in the state in which the inner winding 520 is wound, the inner winding 520 may be easily wound, and also, an overall assembly of the inner stator 220 may be easy.

Figure 7C:
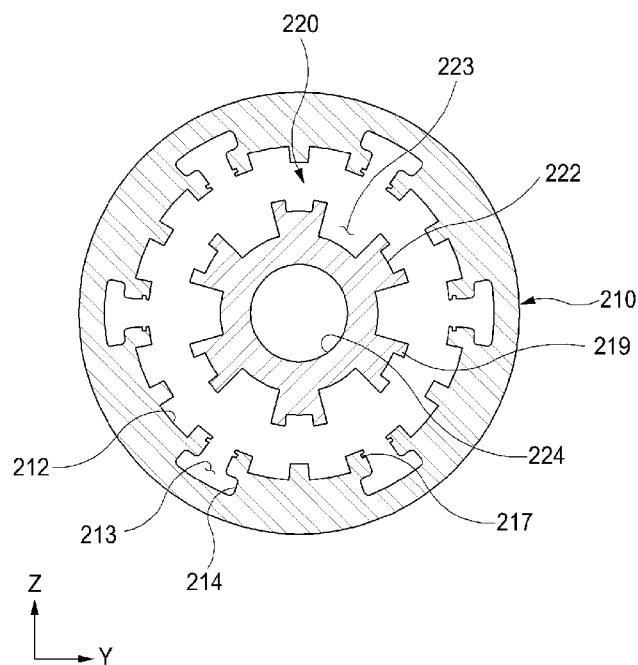

As a third embodiment of the iron core structure, as illustrated in FIG. 7c, each of the outer stator iron core 211 of the outer stator 210 and the inner stator iron core 221 of the inner stator 220 may have an integrally cylindrical shape.

In summary, as illustrated in FIG. 7a, the outer stator 210 may be divided in the circumferential direction to provide the cylindrical shape as a whole, and the inner stator 220 may have the cylindrical shape without being divided.

Also, as illustrated in FIG. 7b, the outer stator 210 may have the cylindrical shape without being divided, and the inner stator 220 may be divided in the circumferential direction to provide the cylindrical shape as a whole.

Also, as illustrated in FIG. 7c, each of the outer stator 210 and the inner stator 220 may have the cylindrical shape without being divided.

Lastly, as illustrated in FIGS. 1 and 2, all of the outer stator iron core 211 of the outer stator 210 and the inner stator iron core 221 of the inner stator 220 may be divided in the circumferential direction to provide the cylindrical shape as a whole.

Embodiments of Coil Winding

The outer stator winding slots 213 may be provided in $3n$ slots (n is a natural number greater than or equal to 2) in the outer stator 210 to apply or generate three-phase power, and the outer windings 510 wound on the outer stator winding slots 213 may be provided as $A_1$ to $A_n$ windings, $B_1$ to $B_n$ windings, and $C_1$ to $C_n$ windings, in which the three-phase power is applied in order of A, B and C with respect to the respective outer stator winding slots 213 in the circumferential direction.

Figure 8:
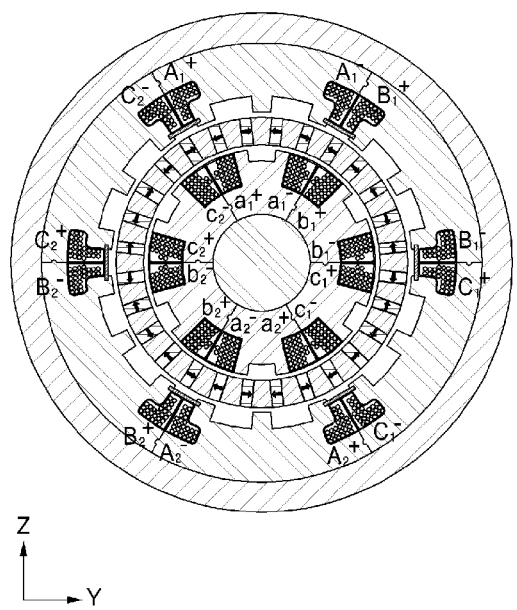
FIG. 8 is a winding arrangement diagram illustrating windings of coils wound around the outer stator and the inner stator according to embodiments of the present invention.

For example, as illustrated in FIG. 8, the outer windings 510 may be arranged in order of $A_1^+$-$A_1^-$, $B_1^+$-$B_1^-$, $C_1^+$-$C_1^-$, $A_2^+$-$A_2^-$, $B_2^+$-$B_2^-$, and $C_2^+$-$C_2^-$ in the circumferential direction to correspond to the three-phase power.

Also, the windings corresponding to the respective phases may be connected to each other in series or in parallel so that power is applied thereto.

That is, various connections may be realized such as the serial or parallel connection of $A1^+$-$A_1^-$ and $A_2^+$-$A_2^-$, the serial or parallel connection of $B_1^+$-$B_1^-$ and $B_2^+$-$B_2^-$, and the serial or parallel connection of $C_1^+$-$C_1^-$ and $C_2^+$-$C_2^-$.

It is preferable that each of the inner windings 520 is wound and disposed to correspond to each of the outer windings 520 so as to correspond to each phase.

Also, as illustrated in FIGS. 9a and 9b, in the outer windings 510 and the inner windings 520, it is preferable that the windings facing the air gap are connected in series so that induced voltage is the same.

Also, when the outer windings 510 and the inner winding 520 are connected to each other, as illustrated in FIG. 9a, it is preferable that the outer windings 510 and the inner winding 520 are connected in series in whole, or connected in parallel to each other so that internal circulation current does not occur as illustrated in FIG. 9b.

Also, the inner stator winding slots 223 may be provided in $3n$ slots (n is a natural number greater than or equal to 2) in the inner stator 220 to apply or generate three-phase power, and the inner windings 520 wound on the inner stator winding slots 223 may be provided as $a_1$ to $a_n$ windings, $b_1$ to $b_n$ windings, and $c_1$ to $c_n$ windings, in which the three-phase power is applied in order of a, b and c with respect to the respective inner stator winding slots 223 in the circumferential direction.

For example, as illustrated in FIG. 8, the inner windings 520 may be arranged in order of $a1^+$-$a_1^-$, $b1^+$-$b_1^-$, $c1^+$-$c_1^-$, $a_2^+$-$a_2^-$, $b_2^+$-$b_2^-$, and $c_2^+$-$c_2^-$ in the circumferential direction to correspond to the three-phase power.

Also, the windings corresponding to the respective phases may be connected to each other in series or in parallel so that power is applied thereto.

That is, various connections may be realized such as the serial or parallel connection of $a1^+$-$a_1^-$ and $a_2^+$-$a_2^-$, the serial or parallel connection of $b_1^+$-$b_1^-$ and $b_2^+$-$b_2^-$, and the serial or parallel connection of $c_1^+$-$c_1^-$ and $c_2^+$-$c_2^-$.

As illustrated in FIGS. 9a to 9c, 10a, and 10b, the winding may be connected in various manners.

That is, the $a_1$ to $a_n$ may be connected in series or in parallel. As illustrated in FIGS. 10a and 10b, $b_1$ to $b_n$ may be connected in series or in parallel, and the $c_1$ to $c_n$ may be connected in series or in parallel.

Also, the $a_1$ to $a_n$ may be connected in series or in parallel. Here, $b_1$ to $b_n$ may be connected in series or in parallel, and the $c_1$ to $c_n$ may be connected in series or in parallel.

For another example of the combination of the outer windings 510 and the inner windings 520, various embodiments may be realized as illustrated in FIGS. 9a to 9c.

As illustrated in FIG. 9a, the windings corresponding to one phase may be connected in series in order of $A_1^+$-$A_1^-$-$a_1^+$-$a_1^-$ and $A_2^+$-$A_2^-$-$a_2^+$-$a_2$.

That is, when the outer windings 510 and the inner windings 520 are connected to each other, the outer windings 510 and the inner windings 520 may be connected in series as a whole.

As illustrated in FIG. 9b, the windings $A_1^+$-$A_1^-$-$a_1^+$-$a_1^-$ and $A_2^+$-$A_2^-$-$a_2^+$-$a_2$ may be connected in series and then connected in parallel to each other.

As illustrated in FIG. 9c, the windings $A_1^+$-$A_1^-$-$A_2^+$-$A_2^-$ and $a_1^+$-$a1^-$-$a_2^+$-$a_2$ may be connected in series and then connected in parallel to each other.

That is, when the outer windings 510 and the inner windings 520 are connected to each other, the outer winding 510 and the inner winding 520 in each phase in which a plurality of phases of respective power are disposed are connected in series, and the phases provided in plurality may be connected in parallel to each other.

FIGS. 9a and 9b illustrate winding arrangement and connection diagrams in FIG. 8. Here, since electromotive force generated by the outer windings 510 and the inner windings 520 are different, the internal circulation current may occur to damage the electric motor when connected in parallel to each other. As a result, when connected in parallel to each other, the outer windings 510 and the inner windings 520 have to be connected to be symmetrical to each other.

Particularly, as illustrated in FIGS. 9a and 9b, it is preferable that the outer windings 510 and the inner windings 520 are connected in series or parallel.

When there is no inner winding 520, like the embodiment illustrated in FIGS. 3 and 4, as illustrated in FIGS. 10a and 10b, it is preferable to be connected in series or in parallel without the winding corresponding to the inner winding 520.

Although only one phase of the three phases is illustrated, it is of course possible to be Y or Δ connected to the remaining two phases.

Rotor Position Sensing Sensor

The electric motor according to the embodiments of the present invention includes the rotating shaft 310 of the rotor 30 to control the rotation thereof and the rotor position sensor 700 installed in the housing 100 to sense a rotation position of the rotor 300.

The rotor position sensor 700 may be installed to sense the rotation position of the rotor 300 with respect to the housing 100 in a relatively fixed state. Here, the rotor position sensor 700 may have various configurations as long as the rotor position sensor 700 senses the rotation position of the rotor 300.

Also, the rotor position sensor 700 may be installed at various positions according to the shapes and structures of the housing 100, the outer stator 210, and the rotor 300.

Particularly, the structure, shape, and arrangement of the rotor position sensor 700 may vary according to the shape and structure of the rotor 300.

For example, the rotor position sensor 700 may include one or more first sensing parts 710 installed on the rotating shaft 310 of the rotor 300 to rotate and second sensing parts 720 installed in the housing 100 to sense a position of the first sensing parts 710.

In more detail, the first sensing parts 710 may be constituted by a plurality of magnetic body protrusions protruding in the radial direction, and the second sensing parts 710 may be constituted by two sensing parts corresponding to the magnetic body protrusions that are the first sensing parts 710.

The plurality of magnetic body protrusions of the first sensing parts 710 may be configured to protrude in the radial direction on the rotating shaft 310 of the rotor 300 and may be integrated with the rotating shaft 310 or provided as separate members and then coupled to the rotating shaft 310.

Particularly, the configuration of the magnetic body protrusions may have a structure similar to the structure disclosed in Patent Document 1. Although the linear structure is disclosed in Patent Document 1, the magnetic body protrusions may be modified so that the protrusion configuration and the sensor module are arranged in a circular shape.

As illustrated in FIG. 11, each of the magnetic body protrusions may be provided so that an angle is $2\tau$ in the circumferential direction.

Here, two sensor modules of the second sensing parts 720 may be installed to correspond to the arrangement of the magnetic body protrusions of the first sensing parts 710. Among them, it is preferable that one sensing module and the other sensing module of the second sensing parts 720 are disposed to be angled at an angle difference of $\tau/2$ with respect to the magnetic body protrusions.

Due to the arrangement as described above, the sensing sensors may sense the rotating shaft 310, i.e., the rotation position of the rotor 300 by using the formula expressed in FIG. 6 of Patent Document 1.

Installation Structure of Rotor Having Double Air Gap

As described above, as illustrated in FIGS. 1 to 6, the rotor 300 and the rotating shaft 310 may be coupled to each other in various manners. That is, the coupling of the rotor 300 and the rotating shaft 310 may be applied to the general electric motor according to the related art, i.e., the induction motor, the permanent magnet motor, and the like to increase in output without being limited to the embodiments of the double air gap electric motor according to the present invention.

Particularly, as another technical aspect of the present invention, the coupling structure of the rotor 300 and the rotating shaft 310 of the electric motor according to the present invention may be constituted by the outer stator 210, the inner stator 520, the rotor 300, the housing 100, the inner support 400, and the bearings 990, 991, 992, and 993.

Also, the second air gap, i.e., two air gaps between the outside of the first air gap 610 and the inner stator 520 and the rotor 300 may be defined between the inside of the outer stator 210 and the rotor 300.

Since the outer stator 210 corresponds to a fixed portion of the most common inner rotor type electric motor, and the inner stator 520 corresponds to a fixed portion of the outer rotor type electric motor, the rotor 300 of the double air gap electric motor may function as the rotating parts of the inner rotor type electric motor and the outer rotor type electric motor at the same time to increase in a mechanical output power in a given volume (an amount of power to be generated in the case of the generator).

Similar to the case of the winding of the double air gap electric motor, the double air gap electric motor may have two windings 500. Thus, the outer winding 510 may be provided in the outer stator 210, and the inner winding 520 may be provided in the inner stator 220. Here, it is preferable that various concentration windings or distribution windings are provided in the outer winding 510 and the inner winding 520 according to the shape of the electric motor.

The structure of the double air gap motor may be variously configured according to the shapes of the rotor and the rotating shaft and the position of the bearing.

As illustrated in FIGS. 12a to 12d, examples of the structure of the double air gap electric motor are divided according to the position at which the rotor 300 and the rotating shaft 310 are coupled and according to the shapes of the rotor and the rotating shaft.

For example, as illustrated in FIGS. 12a and 12b, when the rotor central shaft hub 380 to which the rotating shaft 310 is coupled is disposed inside the housing 100, and the rotating shaft 310 is installed to pass through the housing 100, the bearings 911, 912, 921, and 925 have to be installed at four points.

On the other hand, as illustrated in FIGS. 12c and 12d, when the rotor horizontal hub 381 to which the rotating shaft 310 is coupled is disposed outside the housing 100, and the rotating shaft 310 is coupled to the rotor horizontal hub 381 outside the housing 100, the shaft support bearings 911, 912, 921 may be unnecessary, and thus, the bearings 923 and 925 may be installed at three points to be more stable.

An end of the rotor 300, i.e., the bearings 924 and 925 supporting the extension part 320 may be disposed at various positions. As illustrated in FIGS. 12a and 12c, the bearings 924 and 925 supporting the extension part 320 may be provided as an inner support bearing 925 on the inner circumferential surface of the extension part 320, or as illustrated in FIGS. 12b and 12d, the bearings 924 and 925 supporting the extension part 320 may be provided as a rotor side surface bearing 924 between the ends of the extension part 320 and the inner surface of the housing 100.

The structure illustrated in FIGS. 12a to 12d and the above-described configuration are related to the installation structure of the rotor 300 and the rotating shaft 310 regardless of the type of the electric motor such as the winding of the coil winding and also variously modified.

That is, an electric motor according to another embodiment of the present invention may include: a rotor 300 of which one end of both ends is connected to a rotating shaft 310 that transmits rotational force to the outside; and one or more stators 210 and 220 having two air gaps 610 and 620 respectively defined in outer and inner circumferential surfaces of the rotor 300.

Also, in this embodiment, the stators 210 and 220 include: an outer stator 210 installed with an outer circumferential surface of the rotor 300 and a first air gap 610; and an inner stator 220 installed with an inner circumferential surface of the rotor 300 and a second air gap 620.

Also, the rotor 300 may be configured in various manners, such as those according to the embodiments illustrated in FIGS. 2, 4 to 6, and 12a to 12d.

When comparing the electric motor according to the present invention with the electric motor according to the prior art, the comparison results are as follows.

TABLE 1

Figure 13A:
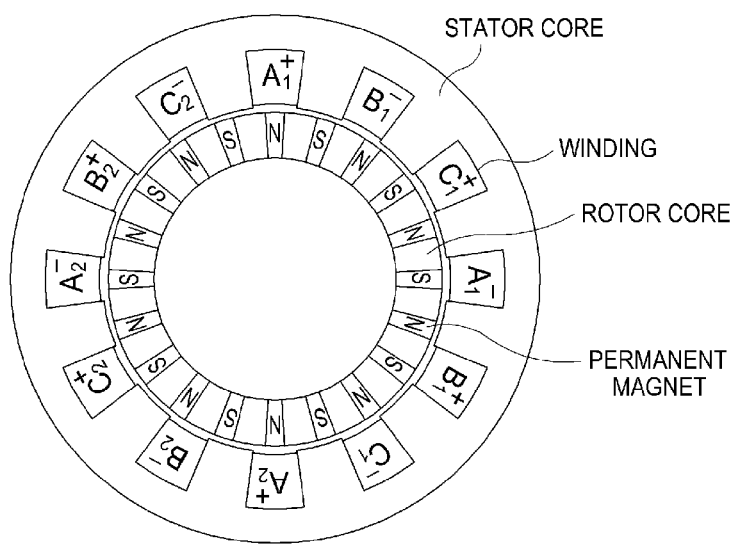
FIGS. 13a to 13d are transverse cross-sectional view of an electric motor according to a related art.
Figure 13B:
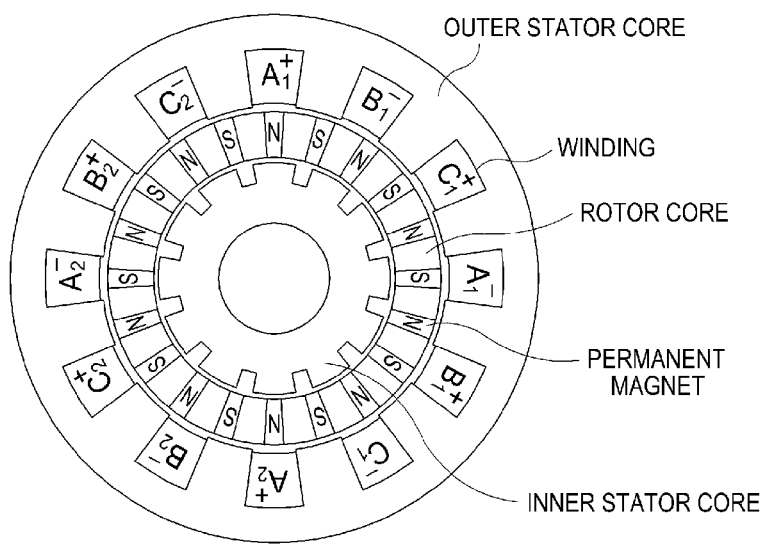
Figure 13C:
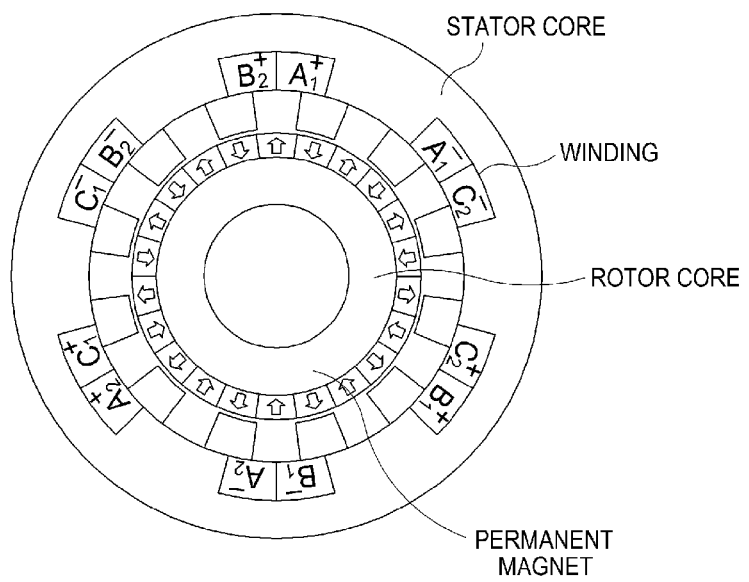
Figure 13D:
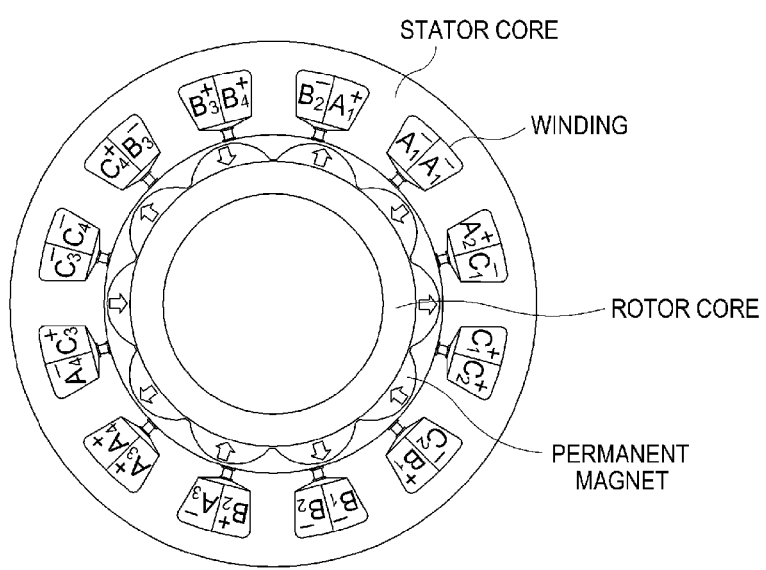

When each of first air gap and second air gap has diameter of 0.3 mm,

| Classification | Force per unit area (kN/m$^2$) on outer circumferential surface of rotor |
|---|---|
| Electric motor having structure illustrated in FIG. 13a | 41 |
| Electric motor having structure illustrated in FIG. 13b | 71 |
| Electric motor having structure illustrated in FIG. 13c | 18.6 |
| Electric motor having structure illustrated in FIG. 13d | 21 |
| The present invention (structure illustrated in FIGS. 3 and 4) | 82 |
| The present invention (structure illustrated in FIGS. 1 and 2) | 118 |

Here, force per unit area on the outer circumferential surface of the rotor is defined as a value obtained by dividing force generated in the rotating shaft 310 by the surface area of the rotor.

Force per unit area on outer circumference of rotor=rotational force/surface area of rotor The force per unit area on the outer circumference of the rotor is expressed in torque as follows.

Force per unit on outer circumference of rotor=$T/2\pi r^2 L_{st}$

Where T is torque, r is a radius, and $L_{st}$ is a length of a cylindrical portion at which the force of the rotor is generated.

TABLE 2

When each of first air gap and second air gap has diameter of 0.8 mm,

| Classification | Force per unit area (kN/m$^2$) on outer circumferential surface of rotor |
|---|---|
| Electric motor having structure illustrated in FIG. 13a | 30 |
| Electric motor having structure illustrated in FIG. 13a | 44 |
| Electric motor having structure illustrated in FIG. 13c | 14.4 |
| Electric motor having structure illustrated in FIG. 13d | 18 |
| The present invention (structure illustrated in FIGS. 3 and 4) | 42 |
| The present invention (structure illustrated in FIGS. 1 and 2) | 66 |

As in the above simulation, in the case of the structure illustrated in FIGS. 1 to 12d, it is seen that the force per unit area (kN/m$^2$) on the rotor outer circumferential surface is greatly improved when compared to the prior art.

Although the electric motor has been described as an example with respect to the present invention, the essential components of the present invention except for the specific components of the electric motor may also be applied to the generator.

Although the above description merely corresponds to some exemplary embodiments that may be implemented by the present invention, as well known, the scope of the present invention should not be interpreted as being limited to the above-described embodiments, and all technical spirits having the same basis as that of the above-described technical spirit of the present invention are included in the scope of the present invention.

The invention claimed is:

1. A rotating electric device comprising:
   an outer stator comprising an outer stator iron core having a plurality of outer stator winding slots defined in an inner circumferential surface thereof at a predetermined interval in a circumferential direction and an outer winding wound around outer stator iron core teeth that is relatively formed by a pair of outer stator winding slots adjacent to each other;
   an inner stator comprising an inner stator iron core having a plurality of inner stator winding slots defined in an outer circumferential surface thereof at a predetermined interval in the circumferential direction and an inner winding wound around inner stator iron core teeth that is relatively formed by a pair of inner stator winding slots adjacent to each other; and
   a rotor having a first air gap with respect to the outside and a second air gap with respect to the inside between the outer stator and the inner stator, the rotor being rotatably installed so that a plurality of rotor iron cores and a plurality of permanent magnets are coupled to each other in the circumferential direction in a state in which each of the plurality of rotor iron cores are disposed between the permanent magnets,
   wherein the outer stator iron core has at least one outer stator iron core slot defined in the inner circumferential surface thereof so as to be concave between the pair of outer stator winding slots adjacent to each other, and
   the inner stator iron core has at least one inner stator iron core slot defined in the outer circumferential surface thereof so as to be concave between the pair of inner stator winding slots adjacent to each other.

2. The rotating electric device of claim 1, wherein the outer winding is installed inside the outer stator winding slots, and the outer stator winding slots are provided in three times in the outer stator to apply or generate three-phase power.

3. The rotating electric device of claim 1, wherein the outer stator iron core is divided into a plurality of parts in the circumferential direction, and the divided outer stator iron cores are coupled to each other in the circumferential direction to provide a cylindrical shape, and
   each of the divided outer stator iron cores is provided by winding the outer winding around each of the outer stator winding slots.

4. The rotating electric device of claim 1, wherein the inner winding is installed inside the inner stator winding slots, and
   the inner stator winding slots are provided in three times in the inner stator to apply or generate the three-phase power.

5. The rotating electric device of claim 1, wherein the inner stator iron core is divided into a plurality of parts in the circumferential direction, and the divided inner stator iron cores are coupled to each other in the circumferential direction to provide a cylindrical shape, and
   the inner stator iron core is provided by winding the inner winding around each of the inner stator winding slots.

6. The rotating electric device of claim 1, wherein the inner stator iron core teeth are respectively positioned in the middle of the outer stator iron core slot, and N-poles and S-poles (→←) of the plurality of permanent magnets of the rotor are alternately installed in the circumferential direction between the rotor iron cores so that magnetic flux of the outer stator smoothly passes through the first air gap, the permanent magnet, the rotor iron core of the rotor and the second air gap to the inner stator and the rotor rotates in a predetermined direction or generates electricity due to electromagnetic interaction of magnetic flux by three-phase power applied or induced to the outer winding of the outer stator.

7. The rotating electric device of claim 1, further comprising a housing to which the outer stator is fixed,
   wherein a position sensor for sensing a rotation position of the rotor is installed at each of a rotating shaft of the rotor and the housing.

8. The rotating electric device of claim 1, further comprising a housing to which the outer stator is fixed,
   wherein at least one end of both ends of the rotor is connected to the rotating shaft of the rotor and coupled to a rotor central shaft hub installed inside the housing.

9. The rotating electric device of claim 8, wherein the housing is provided with an inner support supporting the inner stator so that the rotor rotates while maintaining the first air gap and the second air gap, and
   the inner support rotatably supports the rotor central shaft hub by an inner support outer bearing.

10. The rotating electric device of claim 8, wherein the housing is provided with an inner support supporting the inner stator so that the rotor rotates while maintaining the first air gap and the second air gap, and
    a portion of an end of the inner support is inserted into the rotor central shaft hub, and the inner support rotatably supports the rotor central shaft hub by an inner support outer bearing installed in the inserted portion.

11. The rotating electric device of claim 8, wherein the housing has an opening through which the rotating shaft is exposed to the outside, and
    the rotating shaft is rotatably supported by one or more shaft support bearings installed in the housing.

12. The rotating electric device of claim 1, further comprising a housing to which the outer stator is fixed,
    wherein at least one end of both ends of the rotor is connected to the rotating shaft of the rotor and coupled to a rotor horizontal hub protruding to the outside of the housing, and
    an outer circumferential surface of the rotor horizontal hub is rotatably supported by a rotor horizontal hub bearing installed in the housing.

13. The rotating electric device of claim 12, wherein the housing is provided with an inner support supporting the inner stator so that the rotor rotates while maintaining the first air gap and the second air gap, and
    a portion of an end of the inner support is inserted into the rotor horizontal hub, and the inner support rotatably supports the rotor horizontal hub by a rotor horizontal hub bearing installed in the inserted portion.

14. The rotating electric device of claim 1, further comprising a housing to which the outer stator is fixed,
    wherein the rotor comprises an extension part having one end coupled to a hub part connected to the rotating shaft of the rotor and the other end rotatably supported by bearings installed in the housing.

15. The rotating electric device of claim 14, wherein the bearings rotatably supporting the extension part comprises an inner support bearing installed on an inner circumferential surface of the extension part or a rotor side surface bearing installed on an end of the extension part and an inner surface of the housing.

16. The rotating electric device of claim 1, wherein the outer stator winding slots are provided in $3n$ slots (n is a natural number greater than or equal to 2) in the outer stator to apply or generate the three-phase power, and the outer windings wound on the outer stator winding slots are provided as $A_1$ to $A_n$ windings, $B_1$ to $B_n$ windings, and $C_1$ to $C_n$ windings, in which the three-phase power is connected in order of A, B and C with respect to the respective outer stator winding slots in the circumferential direction.

17. The rotating electric device of claim 16, wherein the $A_1$ to $A_n$ windings are connected to in series or parallel to each other, the $B_1$ to $B_n$ windings are connected to in series or parallel to each other, and the $C_1$ to $C_n$ windings are connected to in series or parallel to each other.

18. The rotating electric device of claim 17, wherein the inner stator further comprises an inner winding wound around each inner stator iron core tooth that is relatively provided by a pair of inner stator winding slots adjacent to each other, the inner stator winding slots are provided in $3n$ slots (n is a natural number greater than or equal to 2) in the inner stator to apply or generate the three-phase power, and the inner windings wound around the inner stator winding slots are provided as $a_1$ to $a_n$ windings, $b_1$ to $b_n$ windings, and $c_1$ to $c_n$ windings, in which the three-phase power is applied in order of a, b and c with respect to the respective inner stator winding slots in the circumferential direction.

19. The rotating electric device of claim 18, wherein the $a_1$ to $a_n$ windings are connected to in series or parallel to each other, the $b_1$ to $b_n$ windings are connected to in series or parallel to each other, and the $c_1$ to $c_n$ windings are connected to in series or parallel to each other.

20. The rotating electric device of claim 18, wherein the outer windings and the inner windings correspond to the three-phase power, the $A_1$ to $A_n$ windings and the $a_1$ to $a_n$ windings are connected to each other in pairs, and the pair of $A_n$ and $a_n$ windings are connected in series or parallel to each other, the $B_1$ to $B_n$ windings and the $b_1$ to $b_n$ windings are connected to each other in pairs, and the pair of $B_n$ and $b_n$ windings are connected in series or parallel to each other, and the $C_1$ to $C_n$ windings and the $c_1$ to $c_n$ windings are connected to each other in pairs, and the pair of $C_n$ and $c_n$ windings are connected in series or parallel to each other.

* * * * *